(12) United States Patent
Baghel et al.

(10) Patent No.: US 10,972,229 B2
(45) Date of Patent: Apr. 6, 2021

(54) HARQ FEEDBACK FOR SIDELINK COMMUNICATION

(71) Applicant: QUALCOMM Incorporated, San Diego, CA (US)

(72) Inventors: Sudhir Kumar Baghel, Hillsborough, NJ (US); Kapil Gulati, Hillsborough, NJ (US); Arjun Bharadwaj, Cupertino, CA (US); Tien Viet Nguyen, Bridgewater, NJ (US); Shailesh Patil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/843,679

(22) Filed: Apr. 8, 2020

(65) Prior Publication Data

US 2020/0351024 A1 Nov. 5, 2020

Related U.S. Application Data

(60) Provisional application No. 62/842,739, filed on May 3, 2019.

(51) Int. Cl.
*H04W 72/12* (2009.01)
*H04L 1/18* (2006.01)
*H04L 5/00* (2006.01)

(52) U.S. Cl.
CPC .......... *H04L 1/1812* (2013.01); *H04L 1/1861* (2013.01); *H04L 5/0055* (2013.01); *H04W 72/1289* (2013.01)

(58) Field of Classification Search
CPC ........................................................ H04L 1/18
See application file for complete search history.

(56) References Cited

U.S. PATENT DOCUMENTS

| 2019/0052436 | A1* | 2/2019 | Desai ............... H04W 72/0446 |
| 2020/0106567 | A1* | 4/2020 | Bharadwaj ........... H04L 5/1469 |

OTHER PUBLICATIONS

International Search Report and Written Opinion—PCT/US2020/028316—ISA/EPO—dated Jul. 23, 2020.
Kyocera: "A Reliable Groupcast HARQ feedback scheme for NR V2X", 3GPP TSG-RAN WG1#96, 3GPP Draft; R1-1902132, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019 Feb. 14, 2019 (Feb. 14, 2019), pp. 1-4, XP051599827, Retrieved from the Internet: URL: http://www.3gpp.org/ftp/tsg%5Fran/WG1%5FRL1/TSGR1%5F96/Docs/R1%2D1902132%2Ezip [retrieved on Feb. 14, 2019].

(Continued)

*Primary Examiner* — Sulaiman Nooristany
(74) *Attorney, Agent, or Firm* — Harrity & Harrity, LLP

(57) ABSTRACT

Various aspects of the present disclosure generally relate to wireless communication. In some aspects, a user equipment (UE) may receive one or more sidelink communications on a sidelink between the UE and another UE. The UE may transmit one or more hybrid automatic repeat request (HARQ) feedback communications, associated with the one or more sidelink communications, on the sidelink and in a HARQ feedback resource included in a multi-slot feedback reporting period. The HARQ feedback resource may include a set of negative acknowledgement (NACK) resources or the set of NACK resources and a set of acknowledgement (ACK) resources. Numerous other aspects are provided.

30 Claims, 8 Drawing Sheets

(56) References Cited

OTHER PUBLICATIONS

Lg Electronics: "Discussion on Physical Layer Procedures for NR Sidelink", 3GPP TSG RAN WG1 Meeting #96bis, 3GPP Draft; R1-1905443 Discussion on Physical Layer Procedure for NR Sidelink, 3rd Generation Partnership Project (3GPP), Mobile Competence Centre ; 650, Route Des Lucioles ; F-06921 Sophia-Antipolis, vol. RAN WG1, No. Xi'an, China; Apr, 8, 2019-Apr. 12, 2019, Apr. 3, 2019 (Apr. 3, 2019), 12 Pages, XP051707513, Retrieved from the Internet: URL: http://www.3gpp.org/ftp/tsg%5Fran/WG1%5FRL1/TSGR1%5F96b/Docs/R1%2D1905443%2Ezip [retrieved on Apr. 3, 2019].
Lg Electronics: "Feature lead summary #2 for agenda item 7.2.4.5, Physical layer procedures for sidelink", 3GPP TSG RAN WG1 Meeting #96bis, 3GPP Draft; R1-1905892, Feature Lead Summary of PHY Procedure in NR Sidelink, Rev, 3rd Generation Partnership Project (3GPP), Mobile Competence Centre ; 650, Route Des Lucioles ; F-06921 Sophia-Anti Poli, val. RAN WG1, No. Xi'an, China; Apr. 8, 2019-Apr. 12, 2019, Apr. 15, 2019 (Apr. 15, 2019), 23 Pages, XP051707935, Retrieved from the Internet: URL: http://www.3gpp.org/ftp/tsg%5Fran/WG1%5FRL1/TSGR1%5F96b/Docs/R1%2D1905892%2Ezip [retrieved on Apr. 15, 2019].
Mediatek Inc: "Discussion on Physical Layer Procedure", 3GPP Draft; 3GPP TSG RAN WG1 #96, R1-1901810, Discussion on Physical Layer Procedure, 3rd Generation Partnership Project (3GPP), Mobile Competence Centre ; 650, Route Des Lucioles ; F-06921 Sophia-Antipolis Cedex; France, vol. RAN WG1, No. Athens, Greece; Feb. 25, 2019-Mar. 1, 2019, Feb. 16, 2019 (Feb. 16, 2019), 9 Pages, XP051599504, Retrieved from the Internet: URL: http://www.3gpp.org/ftp/tsg%5Fran/WG1%5FRL1/TSGR1%5F96/Docs/R1%201901810%2Ezip [retrieved on Feb. 16, 2019].
Mediatek Inc: "Discussion on V2X physical layer procedure", 3GPP TSG RAN WG1 #96bis, 3GPP Draft; R1-1904497 V2X Physical Layer_Procedure, 3rd Generation Partnership Project (3GPP),— Mobile Competence Centre ; 650, Route Des Lucioles ; F-06921 Sophia-Antipolis Cedex ; France, vol. RAN WG1, No. Xi'an, China; Apr, 8, 2019-Apr. 12, 2019 Apr. 3, 2019 (Apr. 3, 2019), 7 pp., XP051707237, Retrieved from the Internet: URL: http://www.3gpp.org/ftp/tsg%5Fran/WG1%5FRL1/TSGR1%5F96b/Docs/R1%2D1904497%2Ezip [retrieved on Apr. 3, 2019].
NEC: "Physical Layer Procedures for NR V2X", 3GPP TSG RAN WG1 #96, 3GPP Draft; R1-1902693, Physical Layer Procedures for NR V2X, 3rd Generation Partnership Project (3GPP), Mobile Competence Centre; 650, Route Des Lucioles ; F-06921 Sophia-Antipolis Cedex ; France, vol. RAN WG1, No, Athens, Greece; Feb. 25, 2019-Mar. 1, 2019, Feb. 15, 2019 (Feb. 15, 2019), pp. 1-6, XP051600388, URL: http://www.3gpp.org/ftp/tsg%5Fran/WG1%5FRL1/TSGR1%5F96/Docs/R1%2131902693%2Ezip [retrieved on Feb. 15, 2019].

* cited by examiner

HARQ FEEDBACK FOR SIDELINK COMMUNICATION

CROSS-REFERENCE TO RELATED APPLICATION

This application claims priority to U.S. Provisional Patent Application No. 62/842,739, filed on May 3, 2019, entitled "HARQ FEEDBACK FOR SIDELINK COMMUNICATION," which is hereby expressly incorporated by reference herein.

FIELD OF THE DISCLOSURE

Aspects of the present disclosure generally relate to wireless communication and to techniques and apparatuses for hybrid automatic repeat request (HARQ) feedback for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving one or more sidelink communications on a sidelink between the UE and another UE; and transmitting one or more hybrid automatic repeat request (HARQ) feedback communications, associated with the one or more sidelink communications, on the sidelink and in a HARQ feedback resource included in a multi-slot feedback reporting period, wherein the HARQ feedback resource includes a set of negative acknowledgement (NACK) resources or the set of NACK resources and a set of acknowledgement (ACK) resources.

In some aspects, a UE for wireless communication may include memory and one or more processors operatively coupled to the memory. The memory and the one or more processors may be configured to receive one or more sidelink communications on a sidelink between the UE and another UE; and transmit one or more HARQ feedback communications, associated with the one or more sidelink communications, on the sidelink and in a HARQ feedback resource included in a multi-slot feedback reporting period, wherein the HARQ feedback resource includes a set of NACK resources or the set of NACK resources and a set of ACK resources.

In some aspects, a non-transitory computer-readable medium may store one or more instructions for wireless communication. The one or more instructions, when executed by one or more processors of a UE, may cause the one or more processors to: receive one or more sidelink communications on a sidelink between the UE and another UE; and transmit one or more HARQ feedback communications, associated with the one or more sidelink communications, on the sidelink and in a HARQ feedback resource included in a multi-slot feedback reporting period, wherein the HARQ feedback resource includes: a set of NACK resources, or the set of NACK resources and a set of ACK resources.

In some aspects, an apparatus for wireless communication may include means for receiving one or more sidelink communications on a sidelink between the apparatus and another apparatus; and means for transmitting one or more HARQ feedback communications, associated with the one or more sidelink communications, on the sidelink and in a HARQ feedback resource included in a multi-slot feedback reporting period, wherein the HARQ feedback resource includes: a set of NACK resources, or the set of NACK resources and a set of ACK resources.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
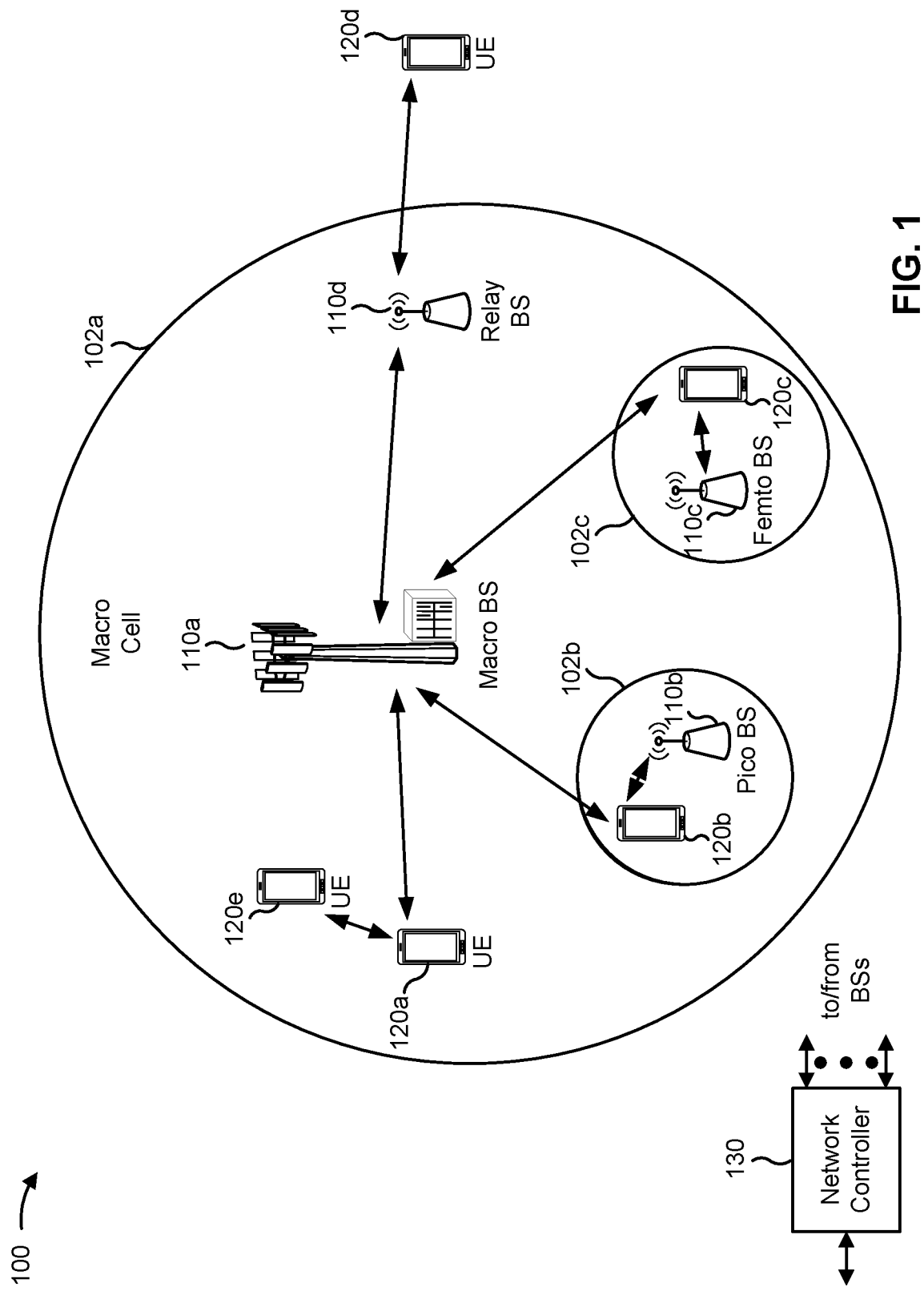
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may communicate with one or more BSs in wireless network 100, may communicate directly with another UE (e.g., UE 120a and UE 120e, as illustrated in FIG. 1) via a sidelink, and/or the like.

A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
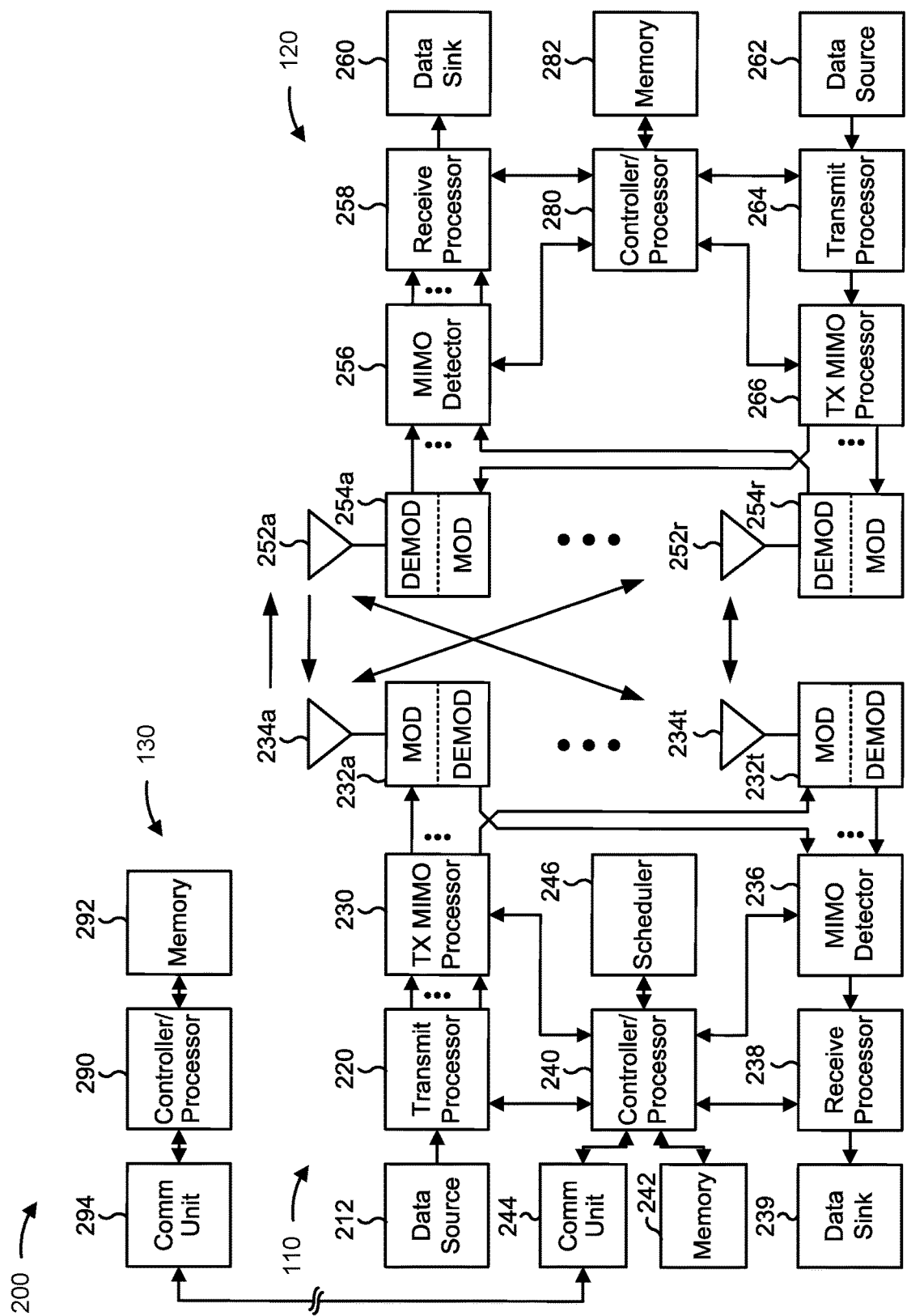
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with hybrid automatic repeat request (HARQ) feedback for sidelink communication, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving one or more sidelink communications on a sidelink between the UE and another UE, means for transmitting one or more hybrid automatic repeat request (HARQ) feedback communications, associated with the one or more sidelink communications, on the sidelink and in a HARQ feedback resource included in a multi-slot feedback reporting period, wherein the HARQ feedback resource includes a set of negative acknowledgement (NACK) resources or the set of NACK resources and a set of acknowledgement (ACK) resources, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
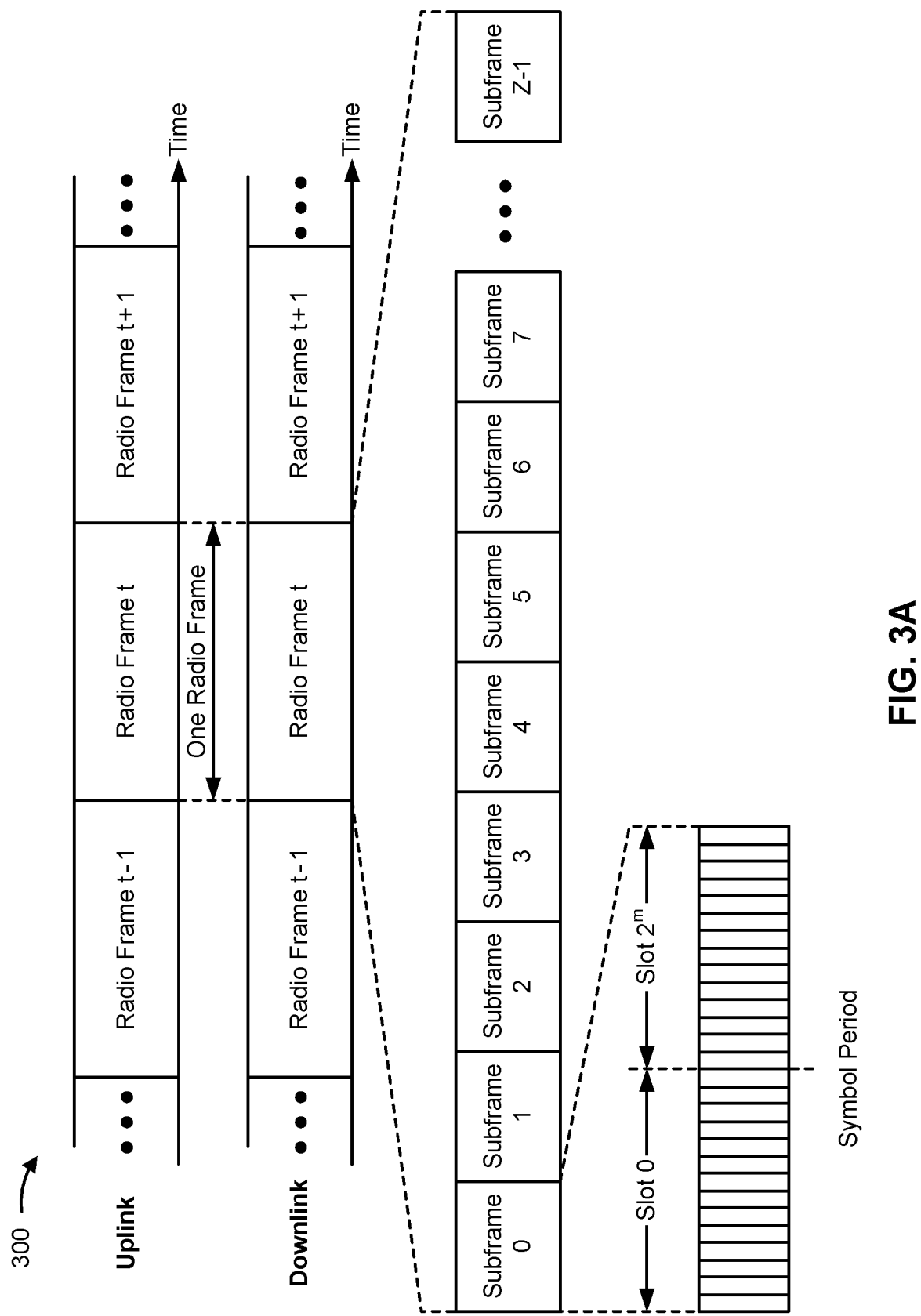
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, a UE (e.g., UE 120a, UE 120e, and/or the like) may transmit, to another UE (e.g., UE 120a, UE 120e, and/or the like) and on a sidelink, one or more sidelink communications in a transmission period, which may include one or more slots included in a frame structure 300. In some aspects, the other UE may receive the one or more sidelink communications, may generate feedback for the one or more sidelink communications, may incorporate the feedback into one or more feedback communications, and may transmit, to the UE and on the sidelink, the one or more feedback communications in one or more symbols and/or slots included in a reporting period, in a frame structure 300, configured for the sidelink.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
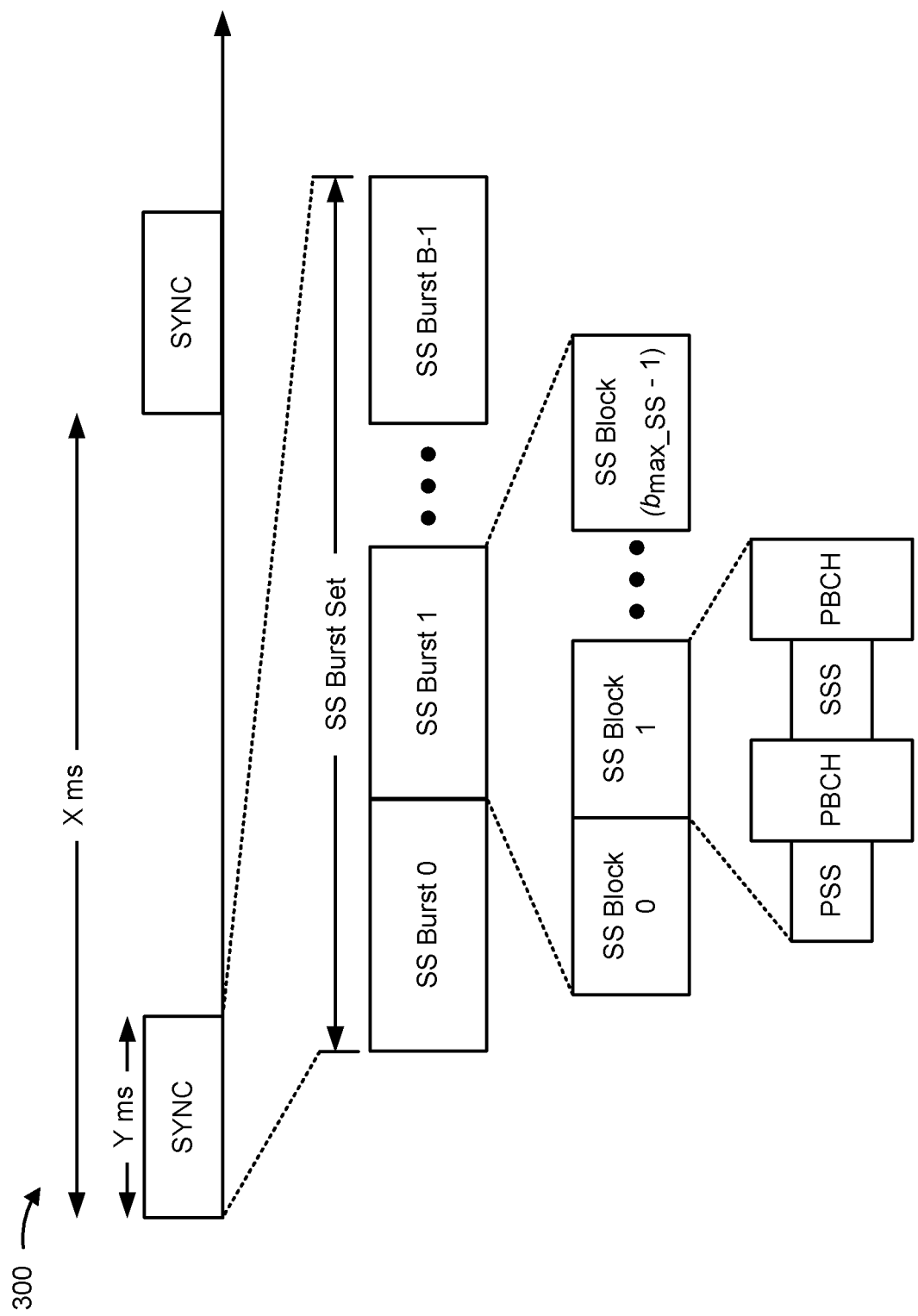
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some cases, two or more subordinate entities (e.g., UEs) may communicate with each other using sidelink signals. Real-world applications of such sidelink communications may include public safety, proximity services, UE-to-network relaying, vehicle-to-everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or BS), even though the scheduling entity may be utilized for scheduling and/or control purposes. In some examples, the sidelink signals may be communicated using a licensed spectrum (unlike wireless local area networks, which may use an unlicensed spectrum).

In some cases, a UE may provide, to another UE, feedback associated with a sidelink communication that was received from the other UE on a sidelink between the UE and the other UE. The feedback may include, for example, HARQ feedback (e.g., NACK or ACK for the sidelink communication). The UE may transmit the feedback in one or more HARQ feedback communications. In some cases, a frame structure for the sidelink may include one or more HARQ feedback reporting symbols, in each slot in the frame structure, that may be used for transmitting the one or more HARQ feedback communications. However, the UE may not need to provide HARQ feedback in every slot in the frame structure, which can result in unused (and therefore wasted) symbols in each slot, which in turn may reduce the efficiency of the frame structure. Moreover, the one or more symbols that are configured for transmitting the one or more HARQ feedback communications may be bound by additional symbols for reception (Rx) to transmission (Tx) turnaround and vice-versa. Since the sidelink may be half-duplex, a UE that is to transmit the one or more HARQ feedback communications may need one or more additional symbols to transition from Rx mode to Tx mode in order to transmit the one or more HARQ feedback communications, and then to transition from Tx mode back to Rx mode after the transmission is complete. The addition of turnaround symbols in each slot in the frame structure can significantly increase the overhead of HARQ feedback reporting on the sidelink if every slot in the frame structure includes one or more symbols for reporting the HARQ feedback.

Some aspects described herein provide techniques and apparatuses for HARQ feedback for sidelink communication. In some aspects, a UE may receive a sidelink communication on a sidelink between the UE and the other UE. The UE may transmit, to the other UE and on the sidelink, one or more HARQ feedback communications, associated with the sidelink communication, in a HARQ feedback resource during a reporting period. The reporting period may be configured such that the HARQ feedback resource (e.g., one or more HARQ feedback reporting symbols), for transmission of the one or more HARQ feedback communications, are only included in a subset of slots included in the frame structure of the sidelink as opposed to every slot. This may reduce the overhead consumed by HARQ feedback reporting on the sidelink, may reduce the quantity of unused HARQ feedback reporting symbols, which in turn may increase the efficiency of the frame structure.

The HARQ feedback resource may be partitioned into subsets of resources for different types of HARQ feedback. For example, the HARQ feedback resource may include a set of NACK resources and a separate set of ACK resources. The set of NACK resources and the set of ACK resources may be further partitioned into individual NACK resources and ACK resources, respectively. This permits NACK communications to be multiplexed in the set of NACK resources for a plurality sidelink communications (e.g., associated with the same UE, associated with different UEs, and/or the like), and permits ACK communications to be multiplexed in the set of ACK resources for a plurality sidelink communications (e.g., associated with the same UE, associated with different UEs, and/or the like).

The reporting period and corresponding HARQ feedback resource may be (pre-)configured in all the UEs, and thus may be system wide. Considering the overhead associated with Rx to Tx and Tx to Rx turnaround, system wide resources (i.e., in complete bandwidth) for HARQ feedback may reduce the overhead consumed by Rx to Tx and Tx to Rx turnaround. These HARQ feedback resources appear periodically as per the configuration.

During a HARQ feedback resource, other transmitters (e.g., UEs) may create a gap in their transmission. To reduce the complexity of implementing system-wide feedback, transmission may start only in the boundary of the feedback resources depending on the configuration of the period. For example, considering a 2 slot feedback period and considering that slots can be aggregated, the transmission can complete just before an upcoming reporting period (e.g., in the case that an even number of slots are aggregated) or the transmission can complete one slot before the upcoming reporting period (in the case that an odd number of slots are aggregated).

Figure 4A:
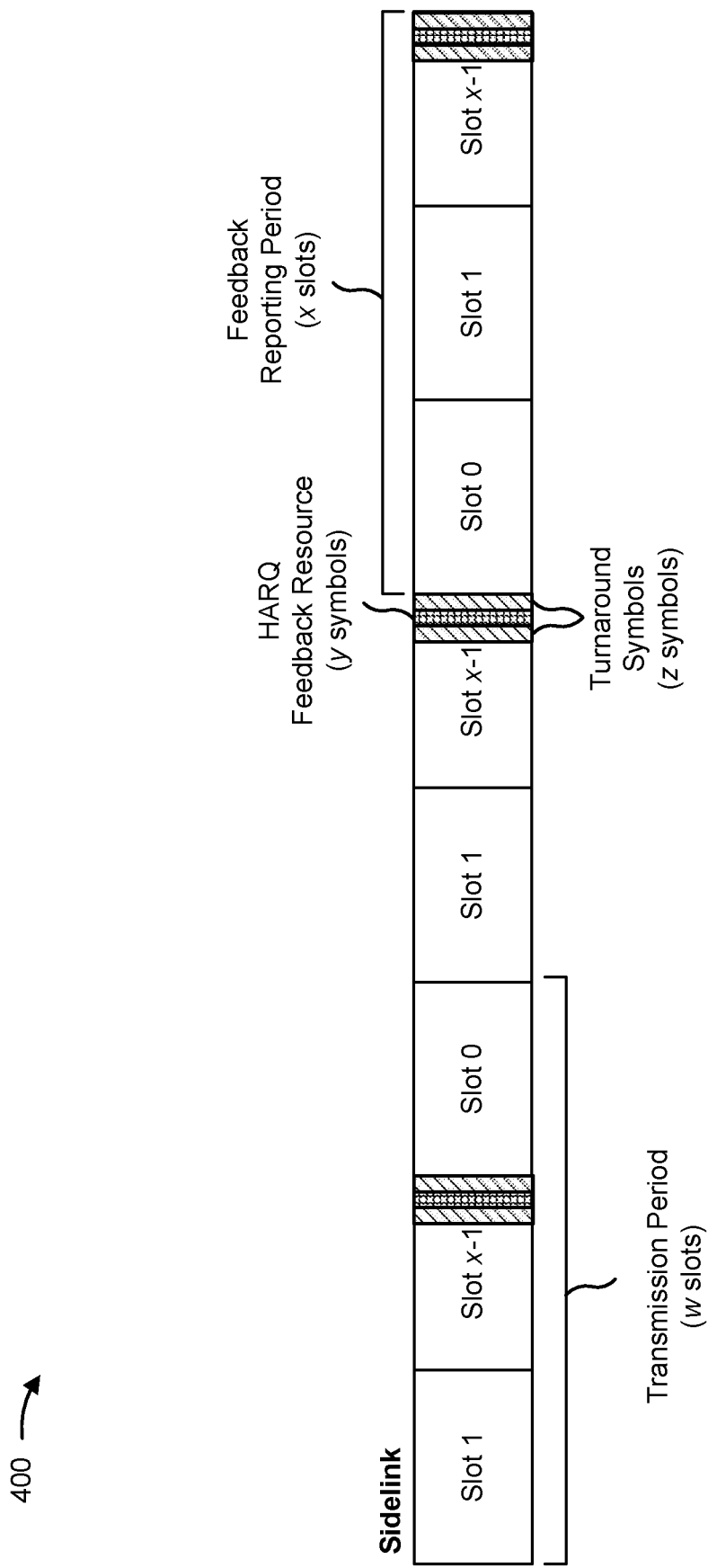
FIGS. 4A-4C are diagrams illustrating one or more examples of hybrid automatic repeat request (HARQ) feedback for sidelink communication, in accordance with various aspects of the present disclosure.
Figure 4B:
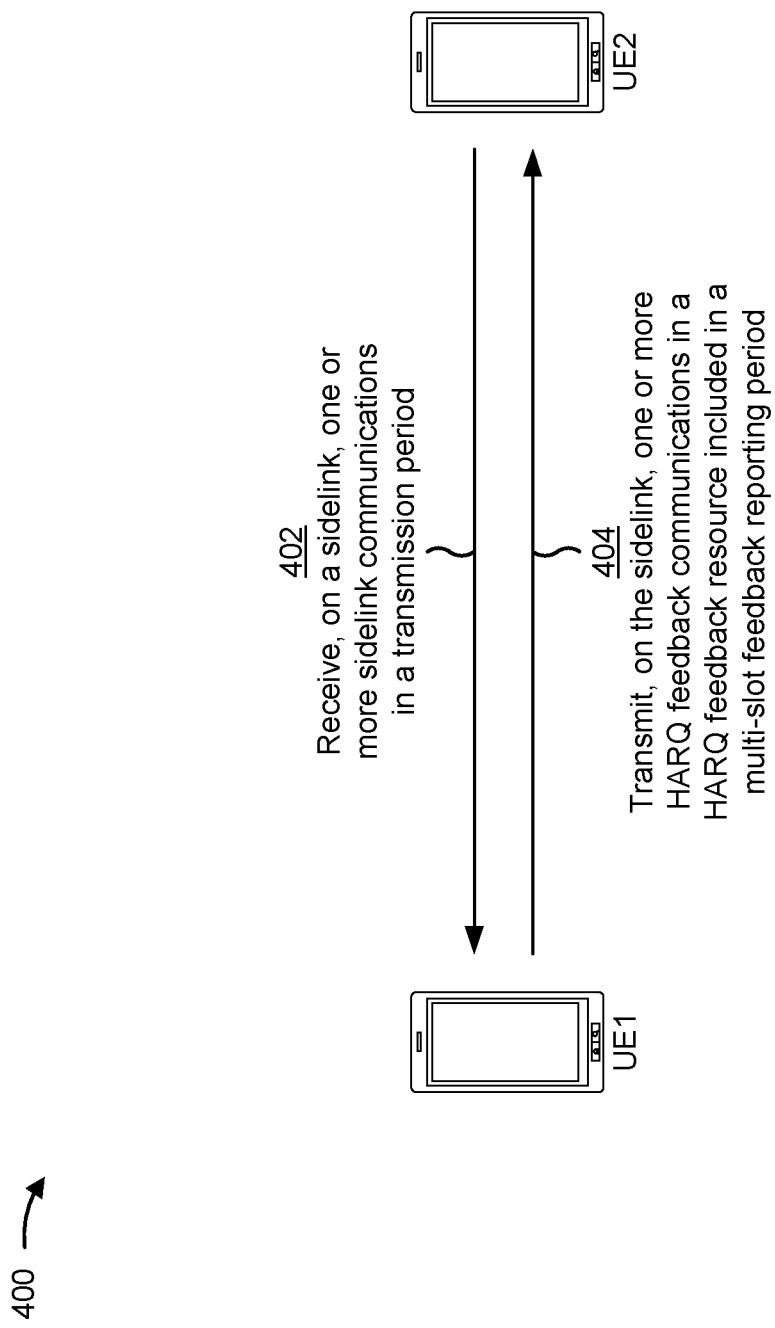
Figure 4C:
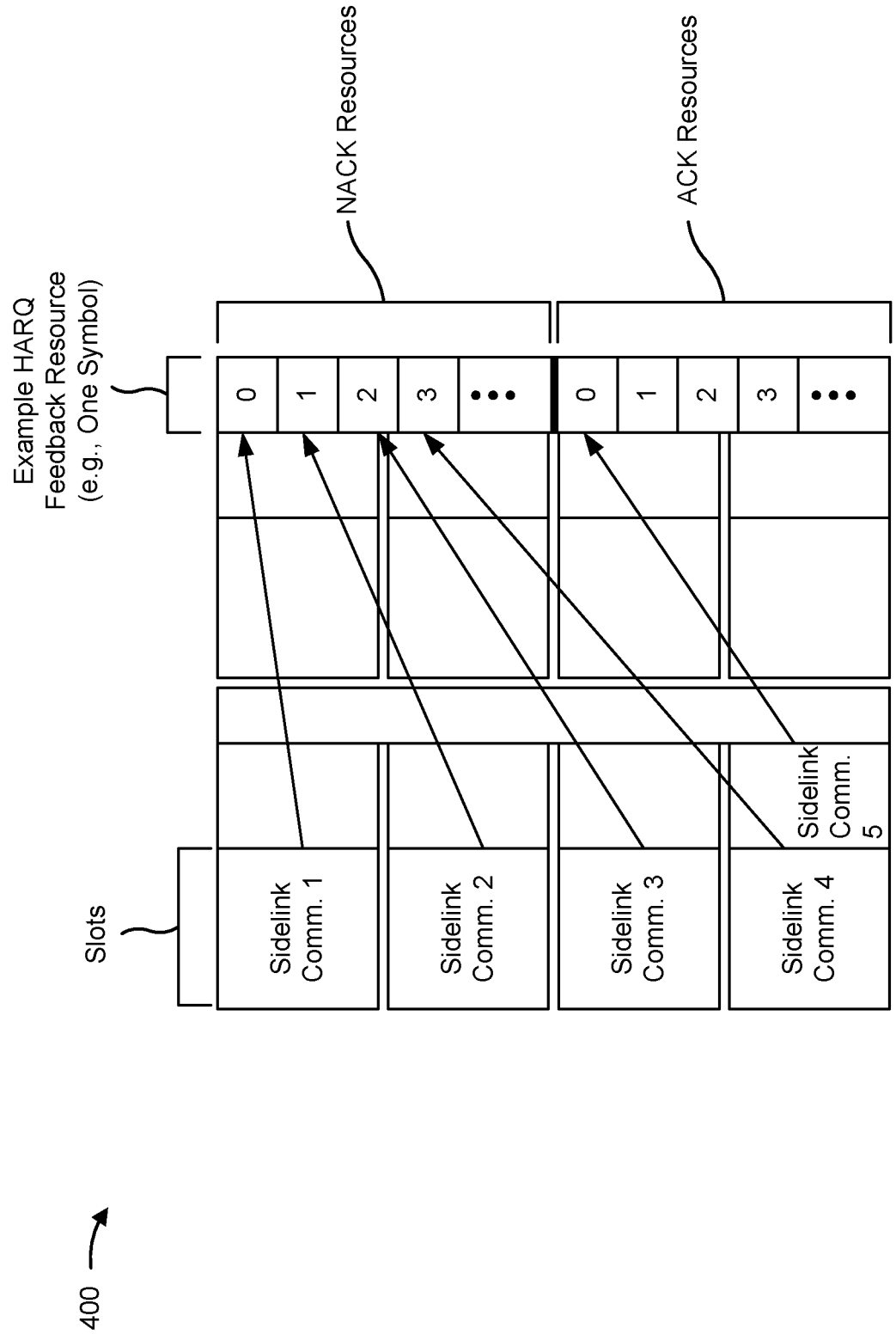

FIGS. 4A-4C are diagrams illustrating one or more examples 400 of HARQ feedback for sidelink communications, in accordance with various aspects of the present disclosure. As shown in FIGS. 4A-4C, examples 400 may include a plurality of UEs (e.g., UE 120), such as UE1 and UE2. However, in some aspects, a greater quantity of UEs may be included in examples 400. UE1 and UE 2 may be included in a wireless network (e.g., wireless network 100) and may communicate via a sidelink. In some aspects, the sidelink may be configured with a frame structure, such as a frame structure 300 of FIG. 3A and/or another sidelink frame structure.

As shown in FIG. 4A, the frame structure of the sidelink may include a plurality of transmission periods. In some aspects, a transmission period may include w slots. UE 120a may transmit, to UE 120e, one or more sidelink communications, in the one or more slots included in a transmission period, and/or vice-versa. The quantity of thew slots included in a transmission period may be configurable by a BS included in the wireless network, by a network function device included in the wireless network, by a network operator of the wireless network, and/or the like. For example, the quantity of the w slots may be configured for the entire wireless network (e.g., may be a system-wide transmission period), for a particular UE, for a particular set of UEs, and/or the like. In some aspects, a transmission period may include a single slot. In some aspects, a transmission period may be a multi-slot transmission period that includes a plurality of slots. In the example illustrated in FIG. 4A, the plurality of transmission periods may each include three slots.

As further shown in FIG. 4A, the frame structure of the sidelink may include a plurality of multi-slot feedback reporting periods (e.g., a feedback reporting period that is to be used for feedback reporting for a plurality transmission period slots). A feedback reporting period may include x slots (e.g., slot 0 through slot x−1). UE1 and/or UE2 may transmit, in a feedback reporting period, one or more HARQ feedback communications that include HARQ feedback (e.g., NACK or ACK) for all or a subset of sidelink communications that complete transmission in a corresponding transmission period. In some aspects, HARQ feedback communications that are to be transmitted by a plurality of UEs in a particular feedback reporting period may be multiplexed together in the feedback reporting period. For example, the HARQ feedback communications may be time division multiplexed, frequency division multiplexed, and/or the like.

In some aspects, a transmission period and corresponding feedback reporting period may be located in adjacent sets of slots in the frame structure. For example, a transmission period may include a first set of three contiguous slots and a corresponding feedback reporting period may include a second set of three contiguous slots that commences directly after the completion of the first set of three contiguous slots. In some aspects, a transmission period and corresponding feedback reporting period may be separated by one or more intervening slots. For example, and as illustrated in FIG. 4A, a transmission period may include a first set of three contiguous slots, a corresponding feedback reporting period may include a second set of three contiguous slots, and the first set of slots may be separated by two intervening slots.

The one or more HARQ feedback communications that are to be transmitted in a feedback reporting period, may be transmitted in a HARQ feedback resource included in a single slot or subset of the x slots included in the feedback reporting period. The HARQ feedback resource may include time domain resources (e.g., y HARQ feedback reporting symbols (e.g., one or more contiguous and/or adjacent symbols) and frequency domain resources (e.g., one or more resource blocks (RBs)). In some aspects, they HARQ feedback reporting symbols may include one or more symbols, one or more portions of one or more symbols (e.g., one or more half symbols, a 10 μs portion of one or more symbols, and/or the like) that are located at or near an end of a particular slot included in the feedback reporting period (e.g., a first slot included in the feedback reporting period, a last slot included in the feedback reporting period, or another slot included in the feedback reporting period). In some aspects, the y HARQ feedback reporting symbols may include one or more symbols that are located at or near a beginning of a particular slot included in the feedback reporting period. In some aspects, they HARQ feedback reporting symbols may include one or more symbols that are located at another location in a slot included in the feedback reporting period.

In some aspects, z turnaround symbols may be located adjacent to the y HARQ feedback reporting symbols. For example, one or more turnaround symbols may be located before they HARQ feedback reporting symbols and one or more turnaround symbols may be located after they HARQ feedback reporting symbols. In this way, if a UE that is to transmit the one or more HARQ feedback communications is receiving sidelink communications in the slot that includes they HARQ feedback reporting symbols, the z turnaround symbols provide the UE with a timing buffer to transition from receiving mode to transmission mode in order to transmit the one or more HARQ communications, and back into receiving mode in order to continue receiving the sidelink communications.

The one or more HARQ feedback communications, that are to be transmitted in a feedback reporting period, may be transmitted in a physical sidelink feedback channel (PSFCH). In some aspects, a UE may transmit a plurality of HARQ feedback communications in the same feedback reporting period, a plurality of UEs may transmit respective HARQ feedback communications in the same feedback reporting period, and/or the like. For example, HARQ feedback communications may be multiplexed in the frequency domain (e.g., using frequency division multiplexing (FDM)) and/or in the time domain (e.g., using time division multiplexing (TDM)) in the HARQ feedback resource.

In some aspects, different types of HARQ feedback communications may be transmitted in separate associated sets of resources included in the HARQ feedback resource. For example, the sets of resources may include a set of NACK resources (e.g., time and/or frequency resources that are to be used for transmitting NACK communications) and a separate set of ACK resources (e.g., time and/or frequency resources that are to be used for transmitting ACK communications). In this case, a UE may transmit one or more NACK communications using one or more NACK resources included in the set of NACK resources, and/or may transmit one or more ACK communications using one or more ACK resources included in the set of ACK resources. Moreover, a plurality of UEs may transmit NACK communications using NACK resources included in the set of NACK resources and/or may transmit ACK communications using ACK resources included in the set of ACK resources.

In some aspects, the HARQ feedback resource may be configured such that the HARQ feedback resources only include a set of NACK resources, and thus only NACK communications are to be transmitted in the HARQ feedback resource. In this case, one or more UEs may transmit one or more NACK communications using NACK resources included in the set of NACK resources.

As shown in FIG. 4B, UE1 and UE2 may perform sidelink communications based at least in part on the frame structure (or similar frame structure) illustrated in FIG. 4A. As shown by reference number 402, UE1 may receive, from UE2, one or more sidelink communications in a transmission period on the sidelink. As shown by reference number 404, UE1 may transmit, to UE2, one or more HARQ feedback communications, associated with the one or more sidelink communications, in a multi-slot feedback reporting period corresponding to the transmission period. That is, UE1 may transmit the one or more HARQ feedback communications in the HARQ feedback resource in the feedback reporting period. The one or more HARQ communications may include one or more NACK communications and/or one or more ACK communications.

In some aspects, UE1 may identify the particular feedback reporting period, from a plurality of feedback reporting periods configured for the sidelink, based at least in part on various factors. In some aspects, UE1 may identify the particular feedback reporting period based at least in part on a processing capability of UE1. For example, if UE1 is capable of receiving the one or more sidelink communications, attempting to decode the one or more sidelink communications, and transmitting the one or more HARQ feedback communications in the next occurring feedback reporting period, UE1 may transmit the one or more HARQ feedback communications in the next scheduled feedback reporting period. Otherwise, UE1 may transmit the one or more HARQ feedback communications in a subsequent feedback reporting period once the one or more HARQ feedback communications are ready to be transmitted.

In some aspects, UE1 may identify the feedback reporting period based at least in part on one or more quality of service (QoS) parameters. For example, UE1 may identify a feedback reporting period that satisfies a latency parameter for transmitting a HARQ feedback communication. As another example, UE1 may identify the feedback reporting period as the next scheduled feedback reporting period based at least in part on a priority parameter assigned to UE1, may identify the feedback reporting period as a subsequent feedback reporting period based at least in part on the priority parameter, assigned to UE1, being a lower priority relative to another UE that is to transmit one or more other HARQ feedback communications in the next scheduled feedback reporting period, and/or the like.

Once UE1 has identified the feedback reporting period and HARQ feedback resource included in the feedback reporting period, UE1 may identify the NACK resources, or NACK resources and ACK resources, included in the HARQ feedback resource that are to be used to transmit the one or more HARQ feedback communications. In some aspects, UE1 may identify the time and/or frequency resources based at least in part on a PSFCH configuration for the feedback reporting period. The PSFCH configuration may include a system-wide PSFCH configuration (e.g., a PSFCH configuration that is to be used by all UEs in the wireless network), may include a UE-specific PSFCH configuration (e.g., a PFSCH configuration that is configured specifically for UE1), a PSFCH configuration configured for a set of UEs (e.g., a set of UEs communicatively connected with a particular base station, a set of UEs associated with a particular subscriber status, and/or the like), and/or the like.

In some aspects, if the PSFCH configuration is a PSFCH configuration configured for a set of UEs, the quantity of UEs included in the set of UEs may be based at least in part on whether the HARQ feedback resource includes NACK resources only or NACK resources and ACK resources, based at least in part on a quantity of NACK resources included in the HARQ feedback resource and/or a quantity of ACK resources included in the HARQ feedback resource, and/or the like.

In some aspects, whether the HARQ feedback resource includes NACK resources only or NACK resources and ACK resources may be based at least in part on the quantity of UEs that are to use the HARQ feedback resource. For example, if the PSFCH configuration is configured by the UE transmitting the sidelink communications (e.g., UE2), the UE transmitting the sidelink communications may specify in the PSFCH configuration that NACK resources and ACK resources are to be used in the HARQ feedback resource (e.g., if the quantity of UEs that are to use the HARQ feedback resource satisfies a threshold quantity) or that only NACK resources are to be used in the HARQ feedback resource (e.g., if the quantity of UEs that are to use the HARQ feedback resource does not satisfy the threshold quantity).

In some aspects, UE1 may receive the PSFCH configuration from UE2, another UE included in the wireless network, a base station included in the wireless network, and/or the like. In some aspects, the PSFCH configuration may be included in a downlink control information (DCI) communication, a radio resource control (RRC) communication, a medium access control (MAC) control element (MAC-CE) communication, a sidelink control information (SCI) communication, and/or the like.

In some aspects, the PSFCH configuration may include an indication of whether the HARQ feedback resource includes a set of NACK resources or a set of NACK resources and a set of ACK resources. In some aspects, the PSFCH configuration may include an indication of a quantity of NACK resources included in the set of NACK resources and/or a quantity of ACK resources included in the set of ACK resources, an indication of respective identifiers associated with the NACK resources included in the set of NACK resources (e.g., NACK resource 0, NACK resource 1, and so on) and/or the ACK resources included in the set of ACK resources (e.g., ACK resource 0, ACK resource 1, and so on), and/or the like.

In some aspects, the PSFCH configuration may indicate whether UE1 is permitted to only transmit NACK communications in the HARQ feedback resource or permitted to transmit NACK communications and ACK communications in the HARQ feedback resource. In some aspects, the HARQ feedback resource may include NACK resources and ACK resources, but UE1 may be permitted to use only the NACK resources while other UEs may be permitted to use the NACK resources and ACK resources. This may occur, for example, based at least in part on a capability of UE1, based at least in part on the quantity of UEs that are configured to use the HARQ feedback resource, and/or the like.

FIG. 4C illustrates an example configuration of a HARQ feedback resource. As shown in FIG. 4C, the example HARQ feedback resource configuration may include a set of NACK resources and a separate set of ACK resources. The HARQ feedback resource may be one symbol in the time domain and one or more RBs in the frequency domain. The set of NACK resources and the set of ACK resources may be TDM in the example configuration. The set of NACK resources may include a plurality of NACK resources as indicated by identifiers NACK resource 0, NACK resource 1, NACK resource 2, NACK resource 3, and so on. The set of ACK resources may include a plurality of ACK resources as indicated by identifiers ACK resource 0, ACK resource 1, ACK resource 2, ACK resource 3, and so on.

FIG. 4C further illustrates an example mapping of HARQ feedback communications, associated with a plurality of sidelink communications (e.g., sidelink communication 1 through sidelink communication 5), to NACK resources and/or ACK resources included in the HARQ feedback resource. In some aspects, a UE (e.g., UE1) may determine the mapping of HARQ feedback communications based at least in part on one or more formulas and/or one or more parameters. The one or more formulas and/or one or more parameters may be indicated, for example, in a PSFCH configuration.

In some aspects, if the UE is to transmit a NACK communication for a received sidelink communication, the UE may determine the mapping of the NACK communication to a NACK resource based at least in part on NACK resource ID=f (Slot$_{Tx}$, RB$_{Tx}$, UEID$_{Tx}$), in which the NACK resource identifier for the NACK communication may be determined based at least in part on a slot identifier associated with a slot in which the corresponding sidelink communication was transmitted (e.g., an ending slot, a starting slot, and/or the like), an RB identifier associated with an RB in which the corresponding sidelink communication was transmitted (e.g., an ending RB, a starting RB, and/or the like), a UE identifier associated with the UE that transmitted the corresponding sidelink communication (e.g., a layer 1 (L1) identifier, a layer 2 (L2) identifier, and/or the like), and/or the like.

Similarly, if the UE is to transmit an ACK communication for a received sidelink communication, the UE may determine the mapping of the ACK communication to an ACK resource based at least in part on ACK resource ID=f (Slot$_{Tx}$, RB$_{Tx}$, UEID$_{Tx}$), in which the ACK resource identifier for the ACK communication may be determined based at least in part on a slot identifier associated with a slot in which the corresponding sidelink communication was transmitted (e.g., an ending slot, a starting slot, and/or the like), an RB identifier associated with an RB in which the corresponding sidelink communication was transmitted (e.g., an ending RB, a starting RB, and/or the like), a UE identifier associated with the UE that transmitted the corresponding sidelink communication (e.g., an L1 identifier, an L2 identifier, and/or the like), and/or the like.

In some aspects, a configuration may be provided such that distance-based HARQ feedback resources may be used. In that case, The UE may also use distance to determine NACK feedback resources along with the slot identifier, RB identifier, UE identifier, and/or the like. The UE may determine the NACK feedback resources based at least in part on steps of configured size distances.

In some aspects, code division multiplexing (CDM) may be used to multiplex HARQ communications in the HARQ feedback resource. In this case, the UE may transmit a HARQ communication with a particular code sequence (e.g., ACK sequence) to uniquely identify the UE relative to other UEs transmitting HARQ communications in the HARQ feedback resource. In some aspects, CDM may be used with particular types of HARQ communications and not used with other types of HARQ communications. For example, in some cases, CDM may be used with ACK communications but not NACK communications.

In this case, the UE may determine which ACK sequence, to use for transmitting a particular ACK communication, based at least in part on one or more formulas and/or one or more parameters. The one or more formulas and/or one or more parameters may be indicated, for example, in a PSFCH configuration. For example, the UE may determine the ACK sequence based at least in part on ACK sequence ID=f (UE_Order$_{Rx}$,Slot$_{Tx}$,RB$_{Tx}$,UEID$_{Tx}$), in which the ACK sequence identifier for the ACK sequence may be determined based at least in part on a slot identifier associated with a slot in which the corresponding sidelink communication was transmitted (e.g., an ending slot, a starting slot, and/or the like), an RB identifier associated with an RB in which the corresponding sidelink communication was transmitted (e.g., an ending RB, a starting RB, and/or the like), a UE identifier associated with the UE that transmitted the corresponding sidelink communication (e.g., L1 identifier, L2 identifier, and/or the like), a UE order associated with the UE (e.g., the UE that received the sidelink communication), and/or the like. In some aspects, the UE order may include an index of the order list of all group member L2 identifiers.

In some aspects, the UE order associated with the UE may be an indication of the UE's position within a logical order of UEs in particular group of UEs. In some aspects, the group of UEs may include the UEs that are configured to use the HARQ feedback resource. In some aspects, the UE may receive an indication of the UE order associated with the UE in a signaling communication, in a PSFCH configuration, and/or the like. The UE order may be determined based at least in part on one or more parameters associated with the UE, such as an L1 identifier, an L2 identifier, upper layer signaling information, and/or the like.

In this way, UE1 may receive a sidelink communication on a sidelink between UE1 and UE2. UE1 may transmit, to UE2 and on the sidelink, one or more HARQ feedback communications, associated with the sidelink communication, in a HARQ feedback resource during a reporting period. The reporting period may be configured such that the HARQ feedback resource (e.g., one or more HARQ feedback reporting symbols), for transmission of the one or more HARQ feedback communications, are only included in a subset of slots included in the frame structure of the sidelink as opposed to every slot. This may reduce the overhead consumed by HARQ feedback reporting on the sidelink, may reduce the quantity of unused HARQ feedback reporting symbols, which in turn may increase the efficiency of the frame structure. Moreover, the HARQ feedback resource may be partitioned into subsets of resources for transmitting NACK communications and/or ACK communications, which permits NACK communications and/or ACK communications to be multiplexed in the HARQ feedback resource.

As indicated above, FIGS. 4A-4C are provided as examples. Other examples may differ from what is described with respect to FIGS. 4A-4C.

Figure 5:
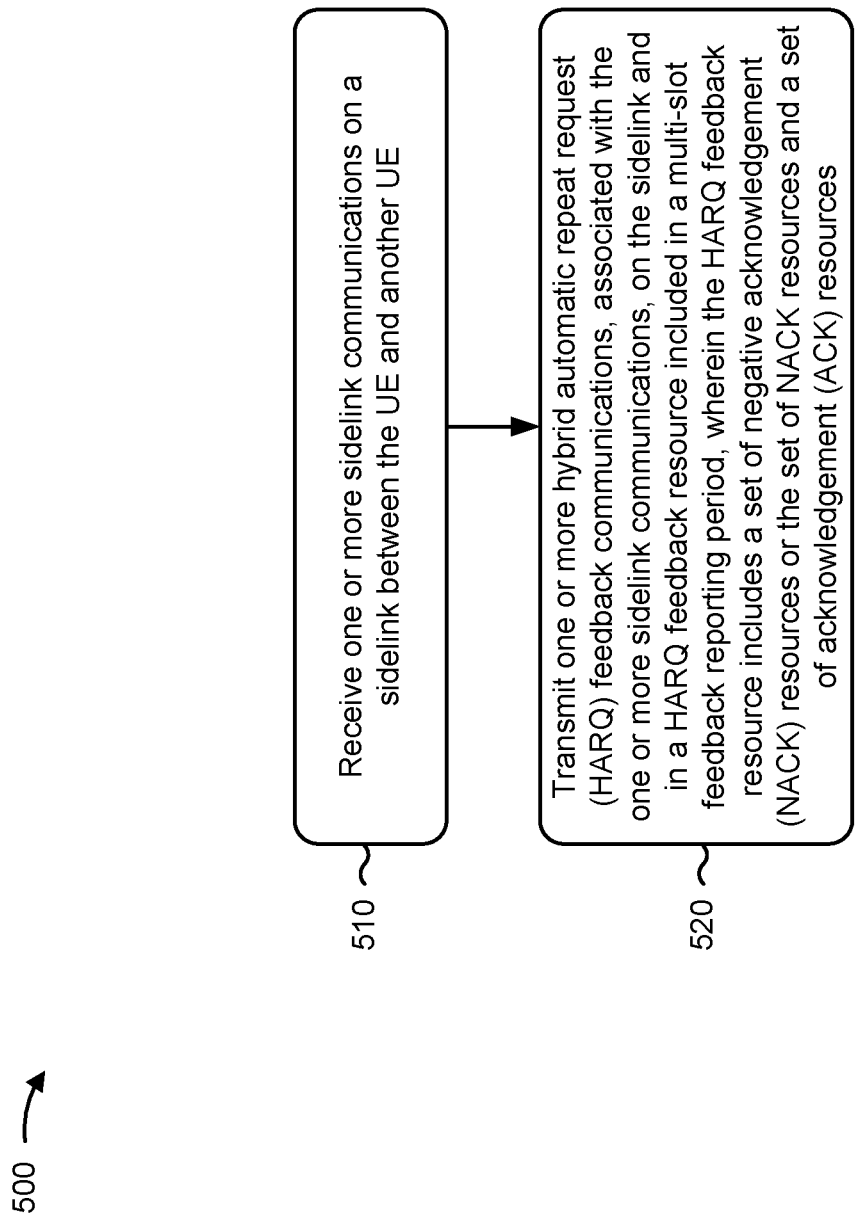
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs operations associated with HARQ feedback for sidelink communication.

As shown in FIG. 5, in some aspects, process 500 may include receiving one or more sidelink communications on a sidelink between the UE and another UE (block 510). For example, the UE (e.g., using receive processor 258, transmit processor 264, controller/processor 280, memory 282, and/or the like) may receive one or more sidelink communications on a sidelink between the UE and another UE, as described above.

As further shown in FIG. 5, in some aspects, process 500 may include transmitting one or more HARQ feedback communications, associated with the one or more sidelink communications, on the sidelink and in a HARQ feedback resource included in a multi-slot feedback reporting period, wherein the HARQ feedback resource includes a set of NACK resources, or and the set of NACK resources and a set of ACK resources (block 520). For example, the UE (e.g., using receive processor 258, transmit processor 264, controller/processor 280, memory 282, and/or the like) may transmit one or more HARQ feedback communications, associated with the one or more sidelink communications, on the sidelink and in a HARQ feedback resource included in a multi-slot feedback reporting period, as described above. In some aspects, the HARQ feedback resource includes a set of NACK resources, or the set of NACK resources and a set of ACK resources.

Process 500 may include additional aspects, such as any single aspect or any combination of aspects described below and/or in connection with one or more other processes described elsewhere herein.

In a first aspect, the HARQ feedback resource includes the set of NACK resources and the set of ACK resources, and transmitting the one or more HARQ feedback communications comprises at least one of transmitting a NACK communication, of the one or more HARQ feedback communications, in the set of NACK resources or transmitting an ACK communication, of the one or more HARQ feedback communications, in the set of ACK resources. In a second aspect, alone or in combination with the first aspect, the HARQ feedback resource includes the set of NACK resources, and transmitting the one or more HARQ feedback communications comprises transmitting a NACK communication, of the one or more HARQ feedback communications, in the set of NACK resources.

In a third aspect, alone or in combination with one or more of the first and second aspects, the HARQ feedback resource includes the set of NACK resources and the set of ACK resources. In a fourth aspect, alone or in combination with one or more of the first through third aspects, the HARQ feedback resource includes the set of NACK resources and the set of ACK resources and the set of NACK resources and the set of ACK resources are time division multiplexed in the HARQ feedback resource. In a fifth aspect, alone or in combination with one or more of the first through fourth aspects, the HARQ feedback resource includes the set of NACK resources and the set of ACK resources, and the set of NACK resources and the set of ACK resources are frequency division multiplexed in the HARQ feedback resource.

In a sixth aspect, alone or in combination with one or more of the first through fifth aspects, the HARQ feedback resource includes the set of NACK resources, process 500 further comprises determining a NACK resource, included in the set of NACK resources, for transmitting the one or more HARQ feedback communications, and transmitting the one or more HARQ feedback communications comprises transmitting a NACK communication, of the one or more HARQ feedback communications, in the NACK resource.

In a seventh aspect, alone or in combination with one or more of the first through sixth aspects, determining the NACK resource comprises determining the NACK resource based at least in part on a slot in which a sidelink communication, of the one or more sidelink communications, associated with the NACK communication was transmitted, an RB in which the sidelink communication was transmitted, and an identifier associated with the other UE. In an eighth aspect, alone or in combination with one or more of the first through seventh aspects, the HARQ feedback resource includes the set of NACK resources and the set of ACK resources, process 500 further comprises determining an ACK resource, included in the set of ACK resources, for transmitting the one or more HARQ feedback communications, and transmitting the one or more HARQ feedback communications comprises transmitting an ACK communication, of the one or more HARQ feedback communications, in the ACK resource.

In a ninth aspect, alone or in combination with one or more of the first through eighth aspects, determining the ACK resource comprises determining the ACK resource based at least in part on a slot in which a sidelink communication, of the one or more sidelink communications, associated with the ACK communication was transmitted, an RB in which the sidelink communication was transmitted, and an identifier associated with the other UE. In a tenth aspect, alone or in combination with one or more of the first through ninth aspects, the ACK communication comprises an ACK code sequence, and determining the ACK code sequence comprises determining the ACK code sequence based at least in part on a slot in which the sidelink communication was transmitted, an RB in which the sidelink communication was transmitted, an identifier associated with the other UE, and a logical order of the UE in a group of UEs.

In an eleventh aspect, alone or in combination with one or more of the first through tenth aspects, process 500 further comprises receiving, from the other UE, an indication of whether the HARQ feedback resource includes the set of NACK resources or the set of NACK resources and the set of ACK resources, and transmitting the one or more HARQ feedback communications comprises transmitting the one or more HARQ feedback communications based at least in part on the indication. In a twelfth aspect, alone or in combination with one or more of the first through eleventh aspects, the indication is included in a PSFCH configuration for the multi-slot feedback reporting period, the PSFCH configuration comprising a system-wide PSFCH configuration, a UE-specific PSFCH configuration, or a PSFCH configuration configured for a set of UEs.

In a thirteenth aspect, alone or in combination with one or more of the first through twelfth aspects, the PSFCH configuration indicates at least one of a quantity of NACK resources included in the set of NACK resources or a quantity of ACK resources included in the set of ACK resources. In a fourteenth aspect, alone or in combination with one or more of the first through thirteenth aspects, the PSFCH configuration comprises the PSFCH configuration configured for the set of UEs, and a quantity of UEs, included in the set of UEs, is based at least in part on at least one of the quantity of NACK resources included in the set of NACK resources or the quantity of ACK resources included in the set of ACK resources.

In a fifteenth aspect, alone or in combination with one or more of the first through fourteenth aspects, the PSFCH configuration comprises the PSFCH configuration configured for the set of UEs, and a quantity of UEs, included in the set of UEs, is used to determine whether the HARQ feedback resource includes the set of NACK resources or the set of NACK resources and the set of ACK resources. In a sixteenth aspect, alone or in combination with one or more of the first through fifteenth aspects, receiving the indication comprises receiving the indication from at least one of the other UE or a base station. In a seventeenth aspect, alone or in combination with one or more of the first through sixteenth aspects, receiving the indication comprises receiving, from the other UE, the indication in an SCI communication.

In an eighteenth aspect, alone or in combination with one or more of the first through seventeenth aspects, the HARQ feedback resource is included in a first slot in the multi-slot feedback reporting period. In a nineteenth aspect, alone or in combination with one or more of the first through eighteenth aspects, process 500 includes receive a PSFCH configuration indicating at least one of a quantity of NACK resources included in the set of NACK resources or a quantity of ACK resources included in the set of ACK resources. In a twentieth aspect, alone or in combination with one or more of the first through nineteenth aspects, process 500 includes determine a NACK resource from the set of NACK resources, or an ACK resource from the set of ACK resources, in which to transmit a HARQ feedback communication of the one or more HARQ feedback communications based at least in part on a slot in which a sidelink communication, of the one or more sidelink communications, associated with the HARQ feedback communication was transmitted, and an RB in which the sidelink communication was transmitted.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a physical sidelink feedback channel (PSFCH) configuration indicating at least one of: a quantity of negative acknowledgement (NACK) resources included in a set of NACK resources, or
   a quantity of acknowledgement (ACK) resources included in a set of ACK resources;
   receiving a plurality of sidelink communications in one or more transmission period slots in a frame structure of a sidelink between the UE and another UE; and
   transmitting a plurality of hybrid automatic repeat request (HARQ) feedback communications, associated with the plurality of sidelink communications, on the sidelink and in a HARQ feedback resource included in a multi-slot feedback reporting period of the sidelink,
   wherein the multi-slot feedback reporting period is a subset of slots included in the frame structure of the sidelink,
   wherein the subset of slots are different from the one or more transmission period slots, wherein the HARQ feedback resource includes one or more symbols in the subset of slots or one or more portions of the one or more symbols, and wherein the HARQ feedback resource includes: the set of (NACK)NACK resources, or the set of NACK resources and the set of ACK resources.

2. The method of claim 1, wherein the HARQ feedback resource includes:
the set of NACK resources and the set of ACK resources; and
wherein transmitting the plurality of HARQ feedback communications comprises at least one of:
transmitting a NACK communication, of the plurality of HARQ feedback communications, in the set of NACK resources, or
transmitting an ACK communication, of the plurality of HARQ feedback communications, in the set of ACK resources.

3. The method of claim 1, wherein the HARQ feedback resource includes:
the set of NACK resources; and
wherein transmitting the plurality of HARQ feedback communications comprises:
transmitting a NACK communication, of the plurality of HARQ feedback communications, in the set of NACK resources.

4. The method of claim 1, wherein the HARQ feedback resource includes:
the set of NACK resources and the set of ACK resources.

5. The method of claim 1, wherein the HARQ feedback resource includes:
the set of NACK resources and the set of ACK resources; and
wherein the set of NACK resources and the set of ACK resources are time division multiplexed in the HARQ feedback resource.

6. The method of claim 1, wherein the HARQ feedback resource includes:
the set of NACK resources and the set of ACK resources; and
wherein the set of NACK resources and the set of ACK resources are frequency division multiplexed in the HARQ feedback resource.

7. The method of claim 1, wherein the HARQ feedback resource includes:
the set of NACK resources;
wherein the method further comprises:
determining a NACK resource, included in the set of NACK resources, for transmitting a HARQ feedback communication of the plurality of HARQ feedback communications; and
wherein transmitting the plurality of HARQ feedback communications comprises:
transmitting a NACK communication, of the plurality of HARQ feedback communications, in the NACK resource.

8. The method of claim 7, wherein determining the NACK resource comprises:
determining the NACK resource based at least in part on:
a slot in which a sidelink communication, of the plurality of sidelink communications, associated with the NACK communication was transmitted,
a resource block (RB) in which the sidelink communication was transmitted, and
an identifier associated with the other UE.

9. The method of claim 1, wherein the HARQ feedback resource includes:
the set of NACK resources and the set of ACK resources;
wherein the method further comprises:
determining an ACK resource, included in the set of ACK resources, for transmitting a HARQ feedback communication of the plurality of HARQ feedback communications; and
wherein transmitting the plurality of HARQ feedback communications comprises:
transmitting an ACK communication, of the plurality of HARQ feedback communications, in the ACK resource.

10. The method of claim 9, wherein determining the ACK resource comprises:
determining the ACK resource based at least in part on:
a slot in which a sidelink communication, of the plurality of sidelink communications, associated with the ACK communication was transmitted,
a resource block (RB) in which the sidelink communication was transmitted, and
an identifier associated with the other UE.

11. The method of claim 9, wherein the ACK communication comprises:
an ACK code sequence; and
wherein determining the ACK code sequence comprises:
determining the ACK code sequence based at least in part on:
a slot in which a sidelink communication was transmitted,
a resource block (RB) in which the sidelink communication was transmitted,
an identifier associated with the other UE, and
a logical order of the UE in a group of UEs.

12. The method of claim 1, further comprising:
receiving, from the other UE, an indication of whether the HARQ feedback resource includes the set of NACK resources or the set of NACK resources and the set of ACK resources; and
wherein transmitting the plurality of HARQ feedback communications comprises:
transmitting the plurality of HARQ feedback communications based at least in part on the indication.

13. The method of claim 12, wherein the indication is included in a the PSFCH configuration; and
wherein the PSFCH configuration comprises: a system-wide PSFCH configuration, a UE-specific PSFCH configuration, or a PSFCH configuration configured for a set of UEs.

14. The method of claim 13, wherein the PSFCH configuration comprises: the PSFCH configuration configured for the set of UEs; and wherein a quantity of UEs, included in the set of UEs, is based at least in part on at least one of: the quantity of NACK resources included in the set of NACK resources, or the quantity of ACK resources included in the set of ACK resources.

15. The method of claim 13, wherein the PSFCH configuration comprises:
the PSFCH configuration configured for the set of UEs; and
wherein a quantity of UEs, included in the set of UEs, is used to determine whether the HARQ feedback resource includes the set of NACK resources or the set of NACK resources and the set of ACK resources.

16. The method of claim 12, wherein receiving the indication comprises:
receiving the indication from at least one of:
the other UE, or
a base station (BS).

17. The method of claim 12, wherein receiving the indication comprises:
receiving, from the other UE, the indication in a sidelink control information (SCI) communication.

18. The method of claim 1, wherein the HARQ feedback resource is included in a first slot in the multi-slot feedback reporting period.

19. A user equipment (UE) for wireless communication, comprising:
a memory; and
one or more processors operatively coupled to the memory, the memory and the one or more processors configured to:
receive a physical sidelink feedback channel (PSFCH) configuration indicating at least one of:
a quantity of negative acknowledgement (NACK) resources included in a set of NACK resources, or
a quantity of acknowledgement (ACK) resources included in a set of ACK resources;
receive a plurality of sidelink communications in one or more transmission period slots in a frame structure of a sidelink between the UE and another UE; and
transmitting a plurality of hybrid automatic repeat request (HARQ) feedback communications, associated with the plurality of sidelink communications, on the sidelink and in a HARQ feedback resource included in a multi-slot feedback reporting period of the sidelink,
wherein the multi-slot feedback reporting period is a subset of slots included in the frame structure of the sidelink,
wherein the subset of slots are different from the one or more transmission period slots, wherein the HARQ feedback resource includes one or more symbols in the subset of slots or one or more portions of the one or more symbols, and
wherein the HARQ feedback resource includes: the set of (NACK)NACK resources, or the set of NACK resources and the set of ACK resources.

20. The UE of claim 19, wherein the HARQ feedback resource is included in a first slot in the multi-slot feedback reporting period.

21. The UE of claim 19, wherein the one or more processors are further configured to:
determine a NACK resource from the set of NACK resources, or an ACK resource from the set of ACK resources, in which to transmit a HARQ feedback communication of the plurality of HARQ feedback communications based at least in part on:
a slot in which a sidelink communication, of the plurality of sidelink communications, associated with the HARQ feedback communication was transmitted, and
a resource block (RB) in which the sidelink communication was transmitted.

22. A non-transitory computer-readable medium storing one or more instructions for wireless communication, the one or more instructions comprising:
one or more instructions that, when executed by one or more processors of a user equipment (UE), cause the one or more processors to:
receive a physical sidelink feedback channel (PSFCH) configuration indicating at least one of:
a quantity of negative acknowledgement (NACK) resources included in a set of NACK resources, or a quantity of acknowledgement (ACK) resources included in a set of ACK resources;
receive a plurality of sidelink communications in one or more transmission period slots in a frame structure of a sidelink between the UE and another UE; and
transmit a plurality of hybrid automatic repeat request (HARQ) feedback communications, associated with the plurality of sidelink communications, on the sidelink and in a HARQ feedback resource included in a multi-slot feedback reporting period,
wherein the multi-slot feedback reporting period is a subset of slots included in the frame structure of the sidelink, wherein the subset of slots are different from the one or more transmission period slots,
wherein the HARQ feedback resource includes one or more symbols in the subset of slots or one or more portions of the one or more symbols, and wherein the HARQ feedback resource includes:
the set of (NACK)NACK resources, or the set of NACK resources and the set of ACK resources.

23. The non-transitory computer-readable medium of claim 22, wherein the HARQ feedback resource is included in a first slot in the multi-slot feedback reporting period.

24. The non-transitory computer-readable medium of claim 22, wherein the one or more instructions, when executed by the one or more processors, further cause the one or more processors to:
determine a NACK resource from the set of NACK resources, or an ACK resource from the set of ACK resources, in which to transmit a HARQ feedback communication of the plurality of HARQ feedback communications based at least in part on:
a slot in which a sidelink communication, of the plurality of sidelink communications, associated with the HARQ feedback communication was transmitted, and
a resource block (RB) in which the sidelink communication was transmitted.

25. An apparatus for wireless communication, comprising:
means for receiving a physical sidelink feedback channel (PSFCH) configuration indicating at least one of:
a quantity of negative acknowledgement (NACK) resources included in a set of NACK resources, or
a quantity of acknowledgement (ACK) resources included in a set of ACK resources;
means for receiving a plurality of sidelink communications in one or more transmission period slots in a frame structure of a sidelink between the apparatus and another apparatus; and
means for transmitting a plurality of hybrid automatic repeat request (HARQ) feedback communications, associated with the plurality of sidelink communications, on the sidelink and in a HARQ feedback resource included in a multi-slot feedback reporting period of the sidelink,
wherein the multi-slot feedback reporting period is a subset of slots included in the frame structure of the sidelink,
wherein the subset of slots are different from the one or more transmission period slots, wherein the HARQ feedback resource includes one or more symbols in the subset of slots or one or more portions of the one or more symbols, and wherein the HARQ feedback resource includes:
the set of (NACK)NACK resources, or the set of NACK resources and the set of ACK resources.

26. The apparatus of claim 25, wherein the HARQ feedback resource is included in a first slot in the multi-slot feedback reporting period.

27. The UE of claim 19, wherein the HARQ feedback resource includes: the set of NACK resources; wherein the one or more processors are further configured to: determine a NACK resource, included in the set of NACK resources, for transmitting a HARQ feedback communication of the plurality of HARQ feedback communications; and wherein the one or more processors, when transmitting the plurality of HARQ feedback communications, are configured to: transmit a NACK communication, of the plurality of HARQ feedback communications, in the NACK resource.

28. The UE of claim 27, wherein the one or more processors, when determining the NACK resource, are configured to: determine the NACK resource based at least in part on: a slot in which a sidelink communication, of the plurality of sidelink communications, associated with the NACK communication was transmitted, a resource block (RB) in which the sidelink communication was transmitted, and an identifier associated with the other UE.

29. The UE of claim 19, wherein the HARQ feedback resource includes: the set of NACK resources and the set of ACK resources; wherein the one or more processors are further configured to: determine an ACK resource, included in the set of ACK resources, for transmitting a HARQ feedback communication of the plurality of HARQ feedback communications; and wherein the one or more processors, when transmitting the plurality of HARQ feedback communications, are configured to: transmit an ACK communication, of the plurality of HARQ feedback communications, in the ACK resource.

30. The UE of claim 29, wherein the one or more processors, when determining the ACK resource, are configured to: determine the ACK resource based at least in part on: a slot in which a sidelink communication, of the plurality of sidelink communications, associated with the ACK communication was transmitted, a resource block (RB) in which the sidelink communication was transmitted, and an identifier associated with the other UE.

* * * * *